United States Patent
Pittock et al.

(10) Patent No.: US 8,345,152 B2
(45) Date of Patent: Jan. 1, 2013

(54) SHUTTER FOR CCD IMAGER

(75) Inventors: Roger John Pittock, Essex (GB); Raymond Thomas Bell, Stanmore (GB)

(73) Assignee: E2V Technologies (UK) Limited, Essex (GB)

( * ) Notice: Subject to any disclaimer, the term of this patent is extended or adjusted under 35 U.S.C. 154(b) by 172 days.

(21) Appl. No.: 12/726,046

(22) Filed: Mar. 17, 2010

(65) Prior Publication Data
US 2010/0245658 A1   Sep. 30, 2010

(30) Foreign Application Priority Data

Mar. 17, 2009   (GB) .................................. 0904548.5

(51) Int. Cl.
*H04N 5/238* (2006.01)
*H04N 5/335* (2006.01)

(52) U.S. Cl. ......... 348/368; 348/294; 348/297; 348/296

(58) Field of Classification Search .................. 348/368, 348/294–308

See application file for complete search history.

(56) References Cited

U.S. PATENT DOCUMENTS

| 4,571,629 A * | 2/1986 | Horio et al. .................... 348/368 |
| 4,695,891 A | 9/1987 | Peterson |
| 5,276,520 A | 1/1994 | Hawkins et al. |
| 5,325,205 A * | 6/1994 | De Rooy ........................ 348/368 |
| 5,894,143 A * | 4/1999 | Tanigawa et al. ............. 257/236 |
| 7,697,060 B2 * | 4/2010 | Kreysar et al. ................ 348/368 |

FOREIGN PATENT DOCUMENTS

| EP | 0 377 914 A1 | 11/1989 |
| EP | 0 488 460 A1 | 11/1991 |

OTHER PUBLICATIONS

United Kingdom Search Report, dated Jun. 22, 2009 in Application No. GB0904548.5.

* cited by examiner

*Primary Examiner* — John Villecco
*Assistant Examiner* — Selam Gebriel
(74) *Attorney, Agent, or Firm* — Venable LLP; Robert Kinberg

(57) ABSTRACT

A CCD sensor has a shutter to prevent frame shift smear during transfer of an image from the image region to a store region. The CCD sensor has an extended dynamic range, because each integration is in two parts, the second part of which has a different sensitivity than the first part. In order to avoid an asymmetry in the uncovering and covering of the image region, a two-bladed shutter is used.

6 Claims, 2 Drawing Sheets

SHUTTER FOR CCD IMAGER

CROSS-REFERENCE TO RELATED APPLICATIONS

This application claims priority to GB 0904548.5 filed in the United Kingdom on Mar. 17, 2009, the disclosure of which is incorporated herein by reference in its entirety.

BACKGROUND OF THE INVENTION

This invention relates to shutters for CCD imagers.

The invention is particularly applicable to CCD imagers having an image region, and a store region connected to the image region Typically, the image region consists of a rectangular array of pixels, and the store region also consists of a rectangular array of pixels. Integration takes place in the image region for one field period. The image is then transferred rapidly from the image region to the store region, line by line, but during a substantially shorter period, known as the frame transfer period. This is done by applying clocked voltages to electrodes in the image region and in the store region. Then, while the next image is being built up in the image region, the image in the store region is clocked out line-by-line into an output register.

Typically, a shutter is used to blank off the optical signal to the image region of the CCD during the frame transfer period to prevent frame shift smear. Frame shift smear would result if the transfer to the store region took place with the image region uncovered, because any bright object detected in a pixel at the bottom of a column would appear in all pixels above it as the column was transferred to the store region. A mechanical rotary device with a blade that obscures the light path during frame transfer is a typical shutter.

The invention is especially concerned with CCD imagers, in which each integration period is in two portions, the second being of different sensitivity to the first. This may be due to signal clipping during the first part of the image, in order to extend the dynamic range of the imager. Such an imager is described and claimed in our concurrently filed and commonly owned U.S. patent application Ser. No. 12/726,050, the disclosure of which is incorporated herein by reference.

A conventional rotary shutter blade would now have a disadvantage if used to prevent frame shift smear because the effective integration period of the signal would no longer be constant over the area of the sensor.

SUMMARY

The invention provides a shutter for a CCD having an image region, wherein the image region has a higher capacity over a second portion of each integration than over a first portion, comprising a pair of blades mounted for rotation about an axis and arranged so that the image region is uncovered by the trailing edge of the second blade and covered by the leading edge of the first blade, to allow the first portion of integration to take place, and uncovered by the trailing edge of the first blade and covered by the leading edge of the second blade, to allow the second portion of integration to take place.

BRIEF DESCRIPTION OF THE DRAWINGS

One way of carrying out the invention will now be described in detail, by way of example, with reference to the accompanying drawings, in which.

DETAILED DESCRIPTION

Figure 1A:
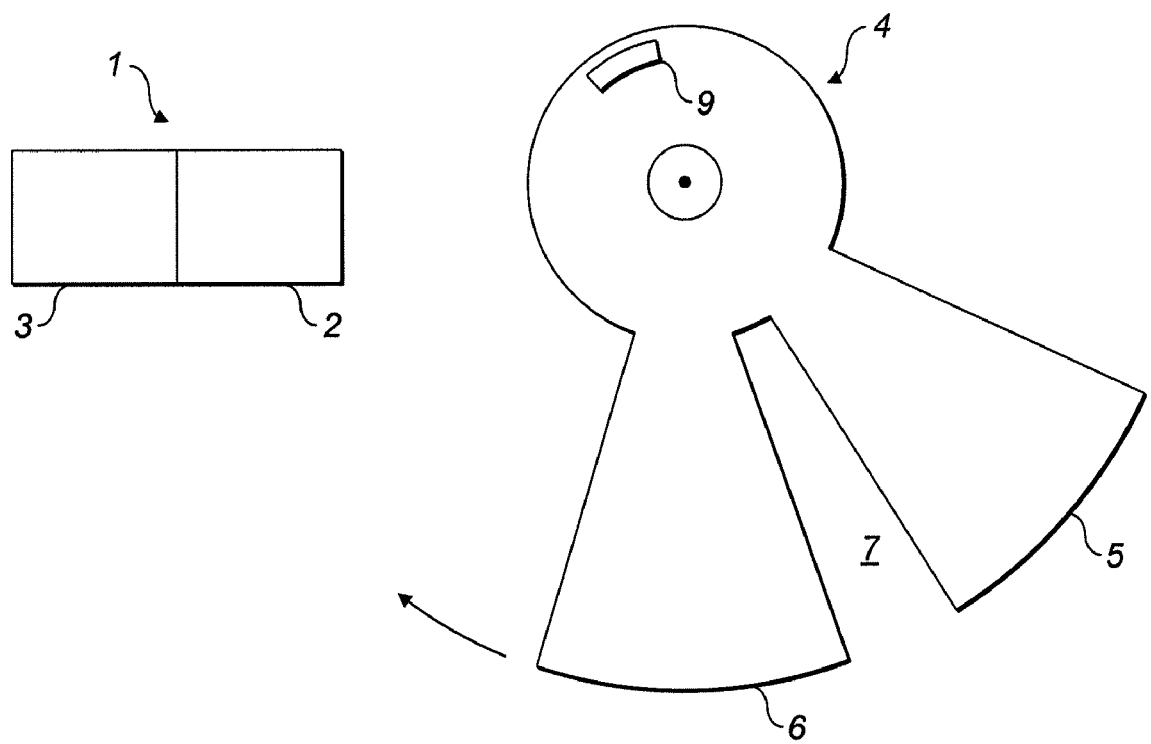
FIG. 1(a) is a schematic front view of the CCD and shutter of the invention.

Referring to FIG. 1(a), a frame transfer CCD indicated generally by the reference numeral 1 has an image region 2 and a store region 3. Images are built up in successive integration periods, transferred to the store region, and read out into an output register (not shown), for example, at a TV signal rate. The CCD is designed to operate in low light levels but, in order to nevertheless distinguish between bright signals of different level, the sensor has an extended dynamic range.

The dynamic range is increased by dividing each integration period into two portions, and clipping the signal in the first (longer) part by capping the capacity of the potential well in which charge is collected, but not in the second (shorter) part. In the first (longer) part, charge over and above that capped value is disposed of into a dump register so as not to affect charge on adjacent pixels, and without affecting materially the rate of charge build-up during that charge-capped section of the exposure at levels below the cap. The charge cap is lifted for the last small part of the exposure, allowing bright signals to accrue above that cap, at the fast rate, but only for a very short time.

One way in which the differential clipping can be achieved is described and claimed in our concurrently filed and commonly owned U.S. patent application Ser. No. 12/726,050, the contents of which are herein incorporated by reference. Charges collected under pairs of electrodes at each pixel are repeatedly combined, during the first portion of the integration, under one only of the electrodes of each pair, to cap the well capacity and thereby clip the signal. However, the present shutter is applicable to other methods of clipping the signal in the first (longer) part, such as by adjusting the level of an anti-blooming drain, such that the well capacity is reduced by overflow into the anti-blooming drain.(U.S. Pat. No. 5 276 520).

The shutter of the invention prevents frame shift smear with the CCD of increased dynamic range and also controls precisely the second exposure period.

Figure 1B:
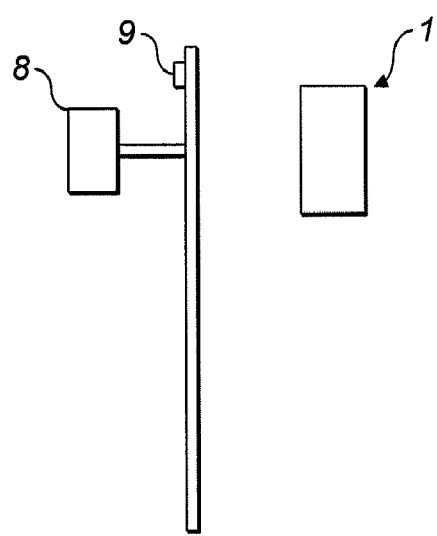
FIG. 1(b) is a schematic end view of the CCD and shutter of FIG. 1(a)
Figure 2A:
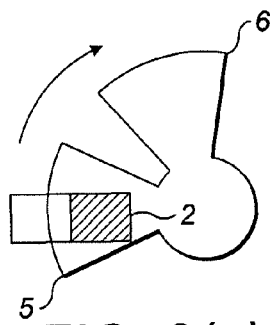
FIGS. 2(a) to 2(l) are schematic front views of the CCD and shutter of the invention on a reduced scale showing various stages in the operation of the shutter.
Figure 2B:
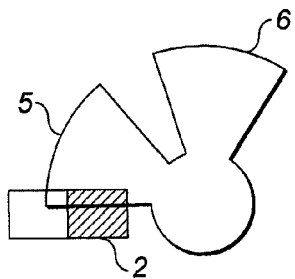
Figure 2C:
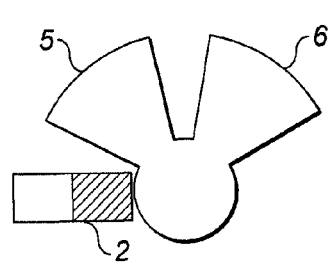
Figure 2D:
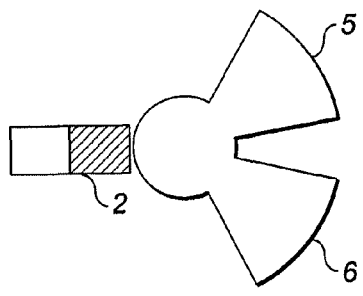
Figure 2E:
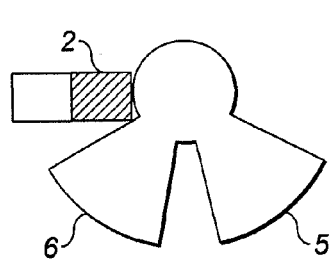
Figure 2F:
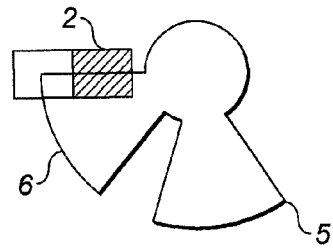
Figure 2G:
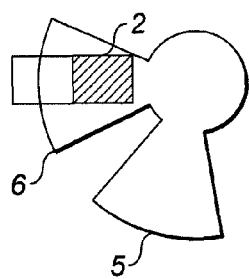
Figure 2H:
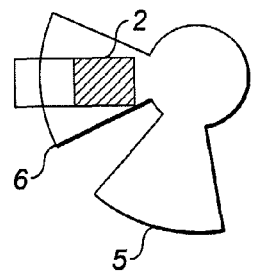
Figure 2I:
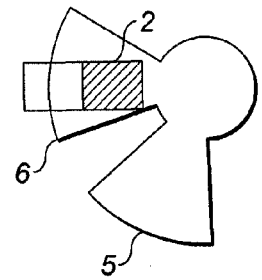
Figure 2J:
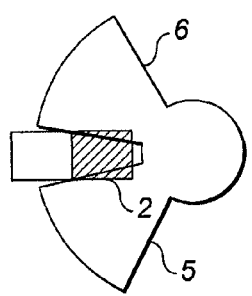
Figure 2K:
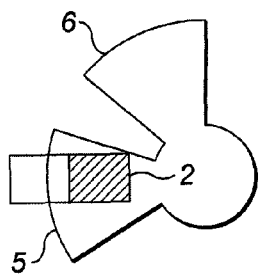
Figure 2L:
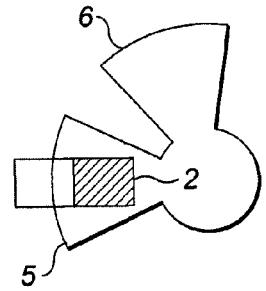

Referring to FIGS. 1 and 2, the shutter is indicated generally by the reference numeral 4 and comprises blades 5, 6 which define a slot 7 between them. The blades 5, 6 are driven by motor 8, to spin in front of the imaging region 2 of the CCD, counterbalanced by weight 9.

The different phases of the shutter as it rotates in front of the imaging region of the CCD sensor are shown in FIGS. 2 (a) to 2 (l). Typically, one complete rotation will correspond with one TV field period, for example, 20 ms.

Referring now to FIGS. 2 (a) to 2 (l), assuming that FIG. 2 (a) represents t=0, the frame transfer of the previous field has finished, the charge capping mechanism is set so as to restrict charge build-up to a level below normal pixel capacity, and the charge-capped exposure is about to start by primary blade 5 just starting to expose the lower right (as drawn) corner of the image region 2 of the CCD sensor 1.

In FIG. 2 (b), at t=approximately 700 µs, the lower (as drawn) (approximately) half of the image region 2 is now exposed.

In FIG. 2 (c), at t=approximately 1.4 ms, primary blade 5 has just moved completely clear of the image region 2 of the sensor 1.

In FIG. 2 (d), after approximately 9 ms, the charge-capped exposure is approximately half-way through, with the lower part of the sensor (as drawn) having had progressively slightly longer exposure than the upper part (as drawn).

In FIG. 2 (e), at t=17.3 ms approximately, secondary blade 6 is just starting to complete the charge-capped part of the exposure, at the lower right corner (as drawn) of the imaging region 2 of the sensor 1.

In FIG. 2 (f), at t=approximately 18 ms, secondary blade 6 obscures approximately half of the imaging region 2 of the sensor 1.

In FIG. 2 (g), at t=approximately 18.7 ms, the imaging region 2 is completely obscured by the secondary blade 6, concluding the charge-capped part of the exposure, with the leading edge of secondary blade 6 matching in shape exactly that of the trailing edge of primary blade 5, ensuring that every part of the imaging region 2 has equal exposure time during the first (charge-capped) portion of the integration period. As drawn, the edges are both radial, but need not be so long as they follow the same profile.

In FIG. 2 (h), at approx t=18.8 ms, part way through the total blocking of the image region by the secondary blade 6, the exposure capping mechanism is lifted, allowing any further exposure to charge up the sensor to a greater level than the previously capped level, without materially affecting the rate of charge build-up when exposure recommences on areas of the sensor not yet having reached the capped level.

In FIG. 2 (i), at approx 18.9 ms, the second portion of the integration period, which is uncapped, is about to start by secondary blade 6 just starting to expose the lower right corner of the image region 2 of the CCD sensor 1.

In FIG. 2 (j), at approximately 19.3 ms, the uncapped exposure has progressed to expose the centre section of the imaging region of the sensor as the slot 7 sweeps over the imaging region 2. Even if the slot width is less than the vertical height of the image region 2, all parts of the image region 2 will receive the same exposure.

In FIG. 2 (k), at approximately 19.7 ms, the leading edge of primary blade 5 has just completely obscured the image region of the sensor, concluding the uncapped part of the exposure. The leading edge of primary blade 5 matches exactly the shape of the trailing edge of secondary blade 6, ensuring that every part of the sensor has equal exposure time during the short uncapped exposure period. Conveniently, both edges extend radially. At this point, frame transfer of the image from the image region 2 to the store region 3 is initiated.

In FIG. 2 (l), at approximately 19.9 ms, primary blade 5 is still completely obscuring the image region of the sensor, frame transfer has completed, completely blocked by the primary blade. The exposure capping mechanism is now lowered so as to restrict the maximum charge level to the capped level described with reference to FIGS. 2 (a) to 2 (h), and the next integration takes place.

Note that there would be an asymmetry in exposure if a conventional single blade was used. If the gap 7 was not present, the increased exposure received by the lower part of the imaging region (FIG. 2(a, b)) at the start of the integration period would not be compensated by the reduced exposure received by it at the end of both parts of the integration period (FIG. 2(j, k)), simply because there is charge capping at the start of the integration period but not at the end.

It will be appreciated that the blades 5, 6 are driven by the motor 8 to spin at a constant rate. The second portion of the integration is essentially controlled by the slot width.

The CCD may be the imaging element of a video camera, in which case the shutter rotates continuously, phase-locked to the field update rate of the camera. However, the invention is applicable to a CCD used as the imaging element of a still camera.

Variations may be made without departing from the scope of the invention. Thus, the charge-uncapped fast exposure could be variable in length by having the two blades separately formed, mounted concentrically, driven by the same motor, with the slot width adjustable either at the factory or by the user. A further refinement of this could be to form a step of approximately half the blade thickness in both blades with respect to the hub, so that when both are back-to-back to form the variable slot width, the blades are coplanar. Still further, the arrangement could have some means to control the slot dynamically. A particular example of this may include an inertia or bob-weight control mechanism, where spinning the blade assembly one way causes a narrow slot, while counter-spinning causes a wider slot.

The invention claimed is:

1. A combination of a shutter and a CCD having an image region, wherein the image region has a different charge capacity over a second portion of each integration from a charge capacity over a first portion, and wherein the shutter comprises a pair of blades mounted for rotation about an axis and arranged so that the image region is uncovered by a trailing edge of a second blade of the pair of blades and covered by a leading edge of a first blade of the pair of blades, to allow the first portion of integration to take place, and uncovered by a trailing edge of the first blade and covered by a leading edge of the second blade, to allow the second portion of integration to take place.

2. A combination as claimed in claim 1, in which the edges all extend in a radial direction.

3. A combination as claimed in claim 1, including a motor for driving the rotation of the blades.

4. A combination as claimed in claim 3, including a counterweight.

5. A combination as claimed in claim 1, including means to adjust the width of the gap between the blades corresponding to the second portion of the integration period.

6. A combination as claimed in claim 1, wherein the image region comprises an array of pixels, a pair of electrodes being associated with each pixel which can be clocked to enable two-phase charge transfer to take place, an anti-blooming structure associated with the pixels, and electrode pulsing means for combining the charges collected under the pair of electrodes at each pixel under one only of the electrodes of each pair, at least once during a first portion of each integration period, but not during a second period of each integration period.

* * * * *